(12) United States Patent
Yang (10) Patent No.: US 9,344,982 B2
(45) Date of Patent: May 17, 2016

(54) TIME SYNCHRONIZATION METHOD AND SYSTEM USING WIFI-DIRECT

(71) Applicant: ZTE Corporation, Shenzhen, Guangdong (CN)

(72) Inventor: Hui Yang, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 14/397,012

(22) PCT Filed: May 30, 2013

(86) PCT No.: PCT/CN2013/076483
§ 371 (c)(1),
(2) Date: Oct. 24, 2014

(87) PCT Pub. No.: WO2013/182009
PCT Pub. Date: Dec. 12, 2013

(65) Prior Publication Data
US 2015/0146713 A1 May 28, 2015

(30) Foreign Application Priority Data
Jun. 4, 2012 (CN) .......................... 2012 1 0181201

(51) Int. Cl.
*H04J 3/06* (2006.01)
*H04W 56/00* (2009.01)
*H04W 84/12* (2009.01)

(52) U.S. Cl.
CPC ........ *H04W 56/0015* (2013.01); *H04W 56/003* (2013.01); *H04W 84/12* (2013.01)

(58) Field of Classification Search
CPC ............ H04W 56/0015; H04W 84/12; H04W 56/003
See application file for complete search history.

(56) References Cited

U.S. PATENT DOCUMENTS

2009/0047924 A1 2/2009 Ray
2010/0289627 A1* 11/2010 McAllister ........... G06Q 10/087
340/10.42

(Continued)

FOREIGN PATENT DOCUMENTS

CN 1750434 A 3/2006
CN 101075848 A 11/2007
WO 2012063491 A1 5/2012

OTHER PUBLICATIONS

International Search Report in international application No. PCT/CN2013/076483, mailed on Sep. 5, 2013.
English Translation of the Written Opinion of the International Search Authority in international application No. PCT/CN2013/076483, mailed on Sep. 5, 2013.

(Continued)

*Primary Examiner* — Jay P Patel
(74) *Attorney, Agent, or Firm* — Oppedahl Patent Law Firm LLC (57) ABSTRACT

Disclosed are a time synchronization method and system using WiFi-direct. The method comprises: a master control device obtaining from a base station standard date and time information used for time synchronization; establishing a WiFi-Direct connection between the master control device and a slave device; in accordance with an active manner, the slave device obtaining a time synchronization manner or a passive reception time synchronization manner, and obtaining the standard date and time information from the master control device through the WiFi-Direct connection; and the slave device calculating an actual standard date and time with the influence of transmission time delay eliminated using the standard date and time information, and setting a system date and time thereof using the actual standard date and time. The master control device of the present invention transmits to each slave device standard date and time information obtained from a base station through Wi-Fi Direct to enable each slave device to achieve time synchronization.

9 Claims, 4 Drawing Sheets

(56) References Cited

U.S. PATENT DOCUMENTS

| | | | |
|---|---|---|---|
| 2011/0170465 A1* | 7/2011 | Tavildar | H04W 56/0015 370/311 |
| 2012/0087503 A1* | 4/2012 | Watson | H04S 3/008 381/23 |
| 2012/0307698 A1 | 12/2012 | Tavildar | |
| 2013/0272277 A1 | 10/2013 | Suwa | |

OTHER PUBLICATIONS

Supplementary European Search Report in European application No. 13801021.0, mailed on Apr. 7, 2015.

Software support for clock synchronization over IEEE 802.11 wireless LAN with open source drivers, Sep. 27, 2010.

The Human Positioning System Based on the WiFi Direct and Precision Time Protocol, Dec. 2011.

* cited by examiner

Fig.4

| message type | mobile phone date | mobile phone time | delay |
|---|---|---|---|
| | | | |

Fig.5

| message type | mobile phone date | mobile phone time | delay | additional information field |
|---|---|---|---|---|
| | | | | |

Fig.6

TIME SYNCHRONIZATION METHOD AND SYSTEM USING WIFI-DIRECT

TECHNICAL FIELD

The disclosure relates to time synchronization technology, and more particularly to a method and system for time synchronization by WiFi-direct.

BACKGROUND

With continuous development of wireless communication technology and rapid popularization of smart phones, a mobile phone has been defined as a modern-life necessity. Generally speaking, a mobile phone not only serves for conventional voice communication, but can also provide various information services, including receiving information on the standard date and time from a base station and displaying the received information on the standard date and time via a display device such as an LCD.

Modern people usually own many digital products such as a notebook computer, a digital camera, a digital photo frame, and the like. The system date and time of such a product has to be set manually.

As stated, a mobile phone can display information on the standard date and time received from a base station only on a local screen, but cannot pass the standard date and time on to another device. Therefore, to display correct date and time information on each digital device, a user has to manually set system date and time for each digital device, which causes great inconvenience to the user.

SUMMARY

Embodiments of the disclosure provide a method and system for time synchronization by WiFi-direct, capable of setting system date and time of a digital device automatically, simplifying user operation and improving user experience.

According to an aspect of the disclosure, a method for time synchronization by WiFi-direct includes steps of:

acquiring, by a master device, information on standard date and time from a base station for time synchronization;

establishing a WiFi-direct connection between the master device and a slave device;

acquiring, by the slave device, the information on the standard date and time actively or passively from the master device through the WiFi-direct connection; and calculating, by the slave device, actual standard date and time without the impact of a transmission delay using the information on the standard date and time, and setting local system date and time as the actual standard date and time.

In an embodiment, the step of acquiring, by the slave device, the information on the standard date and time actively may include steps of:

sending, by the slave device, a time synchronization request to the master device through the WiFi-direct connection to request for the standard date and time, wherein the time synchronization request contains a time stamp of sending the time synchronization request;

receiving, by the slave device, a time synchronization response sent by the master device in response to the time synchronization request, and acquiring a time stamp of receiving the time synchronization response; and analyzing, by the slave device, the time synchronization response, and extracting the information on the standard date and time as well as the time stamp of sending the time synchronization request contained in the time synchronization response.

In an embodiment, the step of calculating, by the slave device, actual standard date and time without the impact of a transmission delay using the information on the standard date and time may include steps of:

calculating, by the slave device, the transmission delay according to the time stamp of receiving the time synchronization response and the time stamp of sending the time synchronization request; and acquiring, by the salve device, the actual standard date and time by adding the transmission delay to the standard date and time.

In an embodiment, the step of acquiring, by the slave device, the information on the standard date and time passively may include steps of:

calculating, by the master device, the transmission delay according to information interaction during establishment of the WiFi-direct connection of the master device with the slave device;

generating, by the master device, a time synchronization message containing information on the transmission delay and the standard date and time, and sending the time synchronization message to the slave device; and after receiving the time synchronization message, extracting, by the slave device, the information on the transmission delay and the standard date and time.

In an embodiment, the step of calculating, by the slave device, actual standard date and time without the impact of a transmission delay using the information on the standard date and time may include a step of:

acquiring, by the salve device, the actual standard date and time by adding the transmission delay to the standard date and time.

In an embodiment, the master device may be a phone mobile, and the slave device may be a digital device.

According to another aspect of the disclosure, a system for time synchronization by WiFi-direct includes a master device and a slave device connected via a WiFi-direct connection, where the master device is configured for acquiring information on standard date and time from a base station for time synchronization; and the slave device is configured for: acquiring the information on the standard date and time actively or passively from the master device through the WiFi-direct connection; calculating actual standard date and time without the impact of a transmission delay using the information on the standard date and time; and setting local system date and time as the actual standard date and time.

In an embodiment, the slave device may include:

a wireless transceiver configured for sending a time synchronization request to the master device through the WiFi-direct connection to request for the standard date and time, and receiving a time synchronization response sent by the master device in response to the time synchronization request, wherein the time synchronization request contains a time stamp of sending the time synchronization request;

a time extracting unit configured for acquiring a time stamp of receiving the time synchronization response; and an analyzing unit configured for analyzing the time synchronization response to extract the information on the standard date and time as well as the time stamp of sending the time synchronization request contained in the time synchronization response.

In an embodiment, the slave device may include:

a time calculating unit configured for calculating the transmission delay according to the time stamp of receiving the time synchronization response and the time stamp of sending the time synchronization request, and acquiring the actual standard date and time by adding the transmission delay to the standard date and time; and a time adjusting unit configured for setting the local system date and time as the actual standard date and time.

In an embodiment, the master device may include:

a transmission delay calculating unit configured for calculating the transmission delay according to information interaction during establishment of the WiFi-direct connection of the master device with the slave device;

a message generating unit configured for generating a time synchronization message containing information on the transmission delay and the standard date and time; and a wireless transceiver configured for sending the time synchronization message to the slave device.

In an embodiment, the message generating unit may be further configured for generating the time synchronization response in response to the time synchronization request.

Based on the method and system for time synchronization by WiFi-direct described herein, a master device transmits information on standard date and time acquired from a base station to a slave device by Wi-Fi Direct, achieving time synchronization among slave devices, simplifying user operation and improving user experience.

DETAILED DESCRIPTION

Embodiments of the disclosure are elaborated below with reference to drawings. Note that the embodiments described below are merely illustrative and explanative and are not to be construed as limiting the disclosure.

In embodiments of the disclosure, a master device (e.g. a mobile phone) receives information on standard date and time from a base station and transmits the received information to a plurality of slave devices (i.e. digital devices other than the master device) by WiFi-direct, such that each of the slave devices may modify local date and time as actual standard date and time.

Embodiments of the disclosure have technical merits as follows.

First, a mobile phone featured by WiFi-direct may extracts information on local date and time and transmits the extracted information to another digital device such that date and time on the other digital device may be synchronized with those on the mobile phone.

Second, in sharing time information by two devices, time required for transmitting the time information between the two devices is taken into account, allowing clock calibration to be as accurate as possible.

As digital devices differ in data processing capacity (for example, data processing capacity of a notebook computer is greater than that of a digital photo frame), time synchronization may be performed actively or passively for a slave device depending on local data processing capacity.

Figure 1:
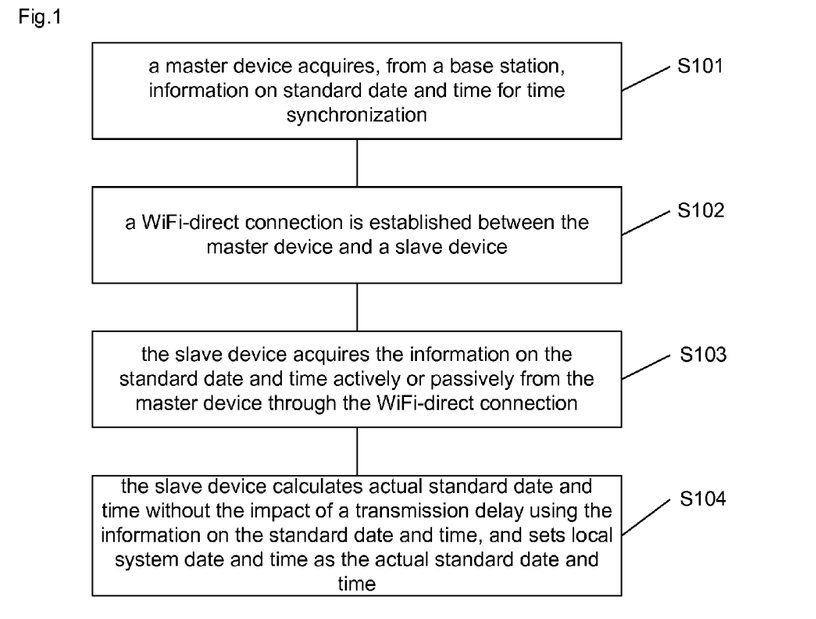
FIG. 1 is a block diagram of a method for time synchronization by WiFi-direct according to an embodiment of the disclosure.

FIG. 1 is a block diagram of a method for time synchronization by WiFi-direct according to an embodiment of the disclosure. As shown in FIG. 1, the method includes steps as follows.

In Step S101, a master device acquires, from a base station, information on standard date and time for time synchronization.

In Step S102, a WiFi-direct connection is established between the master device and a slave device.

In Step S103, the slave device acquires the information on the standard date and time actively or passively from the master device through the WiFi-direct connection.

Figure 2:
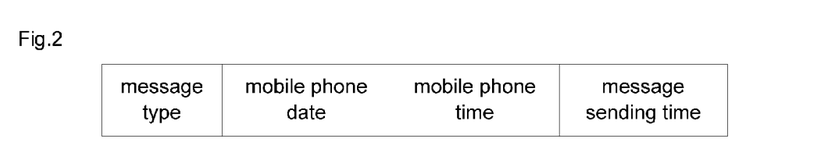
FIG. 2 is a schematic diagram of a PDU format of a time synchronization response for active time synchronization according to an embedment of the disclosure.
Figure 3:
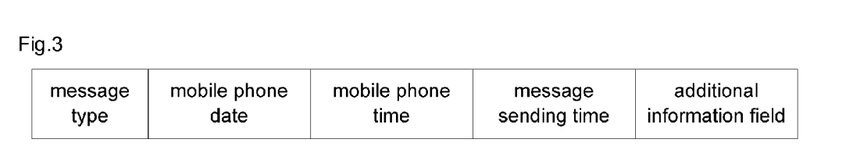
FIG. 3 is a is a schematic diagram of a PDU format of a time synchronization response for active time synchronization with an additional information field according to an embedment of the disclosure.

The slave device may acquire the information on the standard date and time actively by: sending a time synchronization request to the master device through the WiFi-direct connection to request for the standard date and time, where the time synchronization request contains a time stamp of sending the time synchronization request; receiving a time synchronization response (in a format as shown in FIG. 2 or FIG. 3) sent by the master device in response to the time synchronization request, and acquiring a time stamp of receiving the time synchronization response; and analyzing the time synchronization response to extract the information on the standard date and time as well as the time stamp of sending the time synchronization request contained in the time synchronization response.

Figure 4:
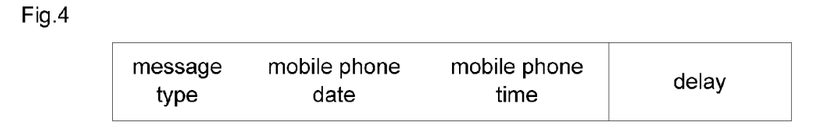
FIG. 4 is a schematic diagram of a PDU format of a time synchronization message for passive time synchronization according to an embedment of the disclosure.
Figure 5:
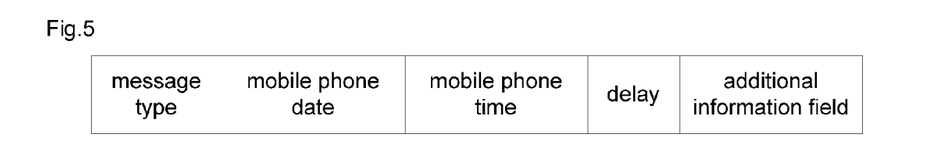
FIG. 5 is a schematic diagram of a PDU format of a time synchronization message for passive time synchronization with an additional information field according to an embedment of the disclosure.

The slave device may acquire the information on the standard date and time passively by: calculating, by the master device, the transmission delay according to information interaction during establishment of the WiFi-direct connection of the master device with the slave device; generating, by the master device, a time synchronization message (in a format as shown in FIG. 4 or FIG. 5) containing information on the transmission delay and the standard date and time, and sending the time synchronization message to the slave device; and after receiving the time synchronization message, extracting, by the slave device, the information on the transmission delay and the standard date and time.

In Step S104, the slave device calculates actual standard date and time without the impact of a transmission delay using the information on the standard date and time, and sets local system date and time as the actual standard date and time.

After acquiring the information on the standard date and time actively, the slave device may calculate the transmission delay according to the time stamp of receiving the time synchronization response and the time stamp of sending the time synchronization request; and acquire the actual standard date and time by adding the transmission delay to the standard date and time.

After acquiring the information on the standard date and time passively, the slave device may acquire the actual standard date and time by adding the transmission delay to the standard date and time.

That is, in active time synchronization, a mobile phone receiving information on the standard date and time from a base station serves as a master device while other digital devices serve as slave devices. A WiFi-direct connection is then established between a slave device and the master device; the slave device applies for information on the standard date and time from the master device, and after receiving the information on the standard date and time, calculates the transmission delay and then the actual standard date and time. The slave device then standardizes the local system date and time using the actual standard date and time. In passive time synchronization, a mobile phone receiving information on the standard date and time from a base station serves as a master device while other digital devices serve as slave devices. A WiFi-direct connection is then established between a slave device and the master device; the master device calculates the transmission delay according to information interaction (PDU interaction) during the establishment of the Wi-Fi Direct connection, sends information on the standard date and time as well as that on the transmission delay to the slave device; the slave device calculates actual standard date and time using the information sent by the master device, and sets the local system date and time to be the actual standard date and time.

In an embodiment, in passive time synchronization, the master device calculates the transmission delay according to PDU interaction during the establishment of the WiFi-direct connection. Information interaction between the master device and the slave device is all based on a request-response mode. The transmission delay may be acquired by calculating the difference between the time of receiving the response PDU and the time of sending the request PDU and then dividing the difference by 2. For example, a premise for performing time synchronization is the establishment of a WiFi-direct connection between the master device and the slave device. In establishing the connection, the master device has to send the slave device a ConnectionEstablishRequest PDU containing any parameter necessary for establishing the connection. The slave device returns a ConnectionEstablish-Setup PDU to the master device, indicating successful establishment of the connection. The master device records the time stamp of sending the ConnectionEstablishRequest PDU and the time stamp of receiving the ConnectionEstablish-Setup PDU, and acquires the transmission delay by calculating the difference between the two time stamps and then dividing the difference by 2.

FIG. 2 is a schematic diagram of a PDU format of a time synchronization response for active time synchronization according to an embedment of the disclosure. As shown in FIG. 2, the format includes a message type field, a mobile phone date field, a mobile phone time field and a message sending time field.

The message type field is configured for distinguishing a time synchronization operation from another operation.

The mobile phone date is the standard date a mobile phone receives from a base station.

The mobile phone time is the standard time the mobile phone receives from the base station.

The message sending time field indicates the time when the slave device sends the time synchronization request PDU, and contains the time for calculating the transmission delay for calculating the actual standard time.

FIG. 3 is a schematic diagram of a PDU format of a time synchronization response for active time synchronization with an additional information field according to an embedment of the disclosure. The format differs from that shown in FIG. 2 in that the format shown in FIG. 3 used in active time synchronization may have an additional information field as needed to facilitate synchronizing system date and time. For example, content in the additional information field enables more accurate time synchronization. Such information field addition falls within the protection scope of the disclosure.

FIG. 4 is a schematic diagram of a PDU format of a time synchronization message for passive time synchronization according to an embedment of the disclosure. As shown in FIG. 4, the format includes a message type field, a mobile phone date field, a mobile phone time field and a delay field.

The message type field is configured for distinguishing a time synchronization operation from another operation.

The mobile phone date is the standard date a mobile phone receives from a base station.

The mobile phone time is the standard time the mobile phone receives from the base station.

The delay field includes the transmission delay in transmitting a PDU in interaction between a master device and a slave device. The transmission delay is calculated by the master device according to PDU interaction during establishment of the WiFi-direct connection.

FIG. 5 is a schematic diagram of a PDU format of a time synchronization message for passive time synchronization with an additional information field according to an embedment of the disclosure. The format differs from that shown in FIG. 4 in that the format shown in FIG. 5 used in passive time synchronization may have an additional information field as needed to facilitate synchronizing system date and time. For example, content in the additional information field enables more accurate time synchronization. Such information field addition falls within the protection scope of the disclosure.

Figure 6:
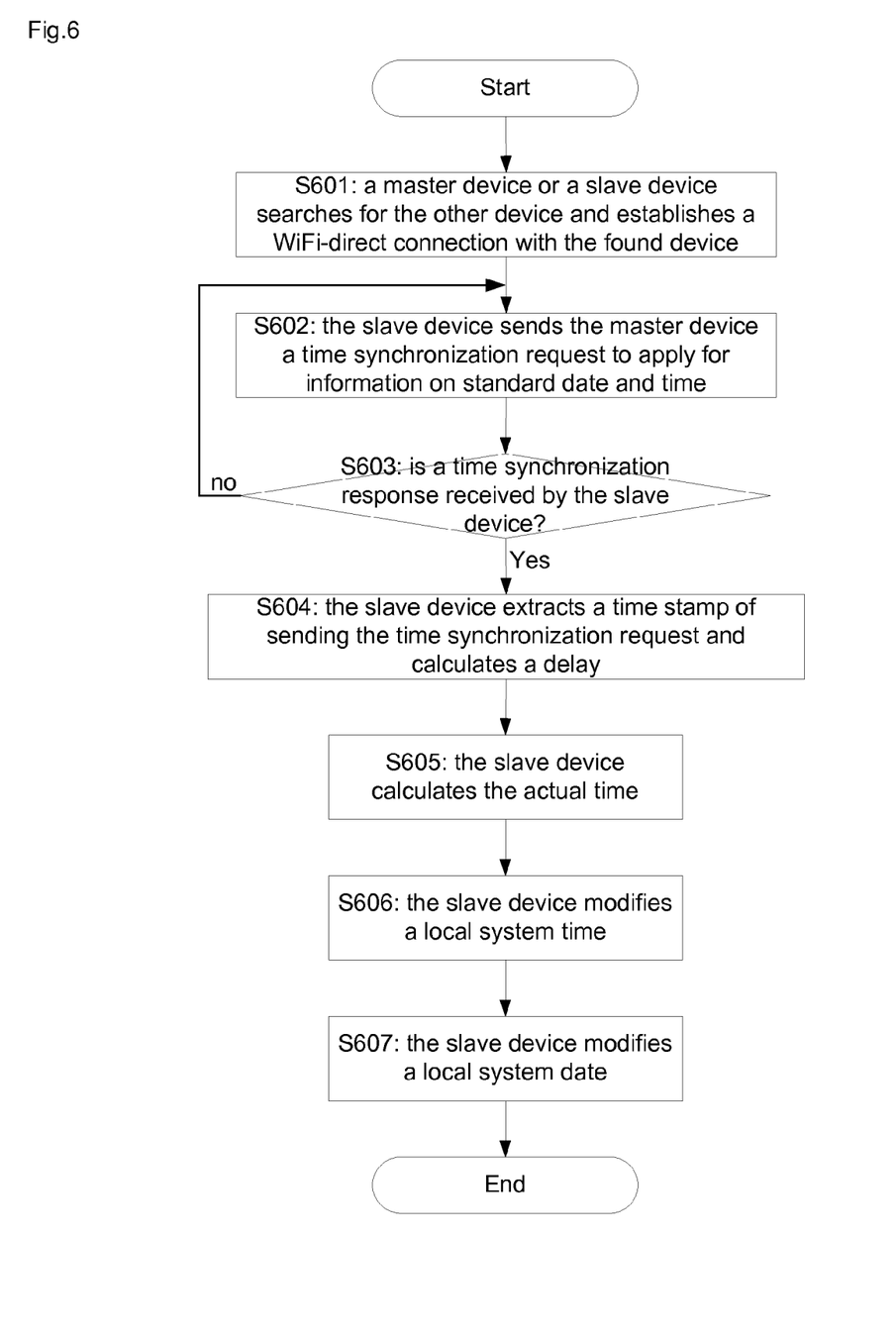
FIG. 6 is a flowchart of active time synchronization according to an embodiment of the disclosure.

FIG. 6 is a flowchart of active time synchronization according to an embodiment of the disclosure. As shown in FIG. 6, the flow of active time synchronization may include steps as follows.

In Step S601, a master device or a slave device searches for the other device and establishes a WiFi-direct connection with the found device.

In Step S602, the slave device sends the master device a time synchronization request using a time setting application to apply for information on standard date and time.

In Step S603: the slave device detects whether a time synchronization response is received; Step S604 is performed when a time synchronization response is received, otherwise when no time synchronization response is received, Step S602 is performed again.

In Step S604, the slave device extracts, from the time synchronization response, a time stamp of sending the time synchronization request PDU, and combines the extracted time stamp with the time stamp of receiving the time synchronization response PDU to calculate a packet transmission delay.

In Step S605, the slave device extracts the standard data and time as well as the packet transmission delay to obtain actual standard date and time.

In Step S606, the slave device standardizes the local system time using information on the actual standard time.

In Step S607, the slave device extracts information on the actual standard date and standardizes the local system date accordingly.

Figure 7:
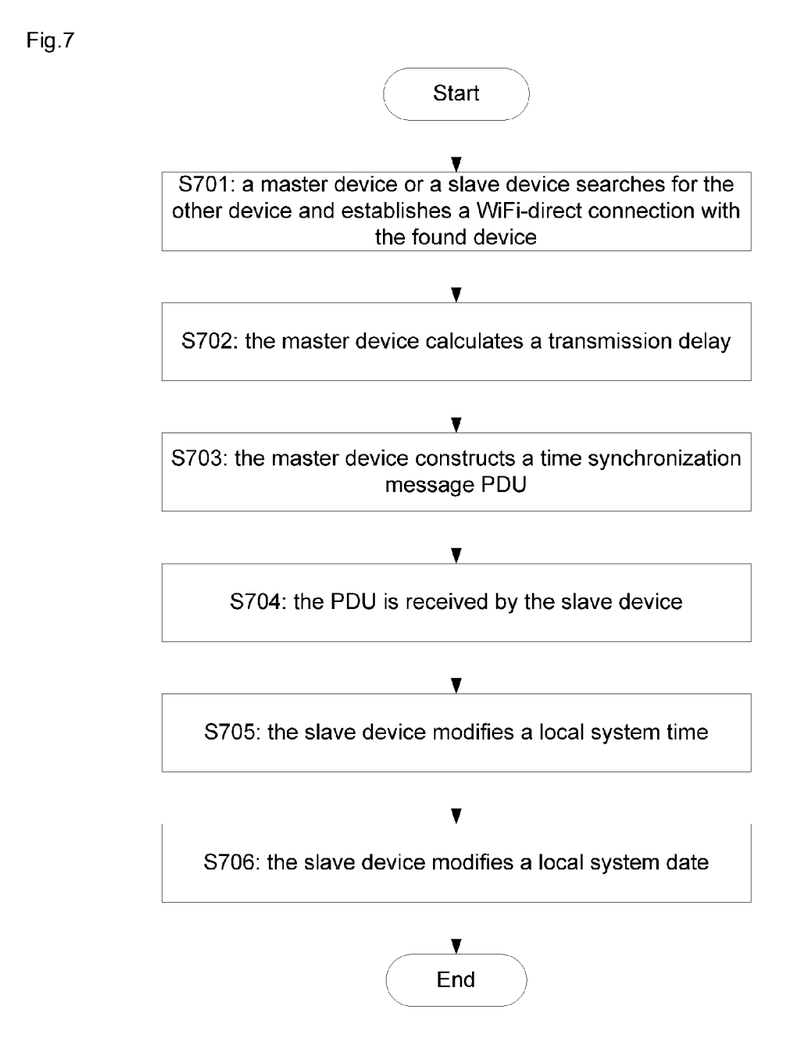
FIG. 7 is a flowchart of passive time synchronization according to an embodiment of the disclosure.

FIG. 7 is a flowchart of passive time synchronization according to an embodiment of the disclosure. As shown in FIG. 7, the flow of passive time synchronization may include steps as follows.

In Step S701, a master device or a slave device searches for the other device and establishes a WiFi-direct connection with the found device.

In Step S702, the master device calculates a packet transmission delay according to PDU interaction during establishment of the WiFi-direct connection.

In Step S703, the master device constructs a time synchronization message PDU by filling standard date and time acquired by the master device from a base station as well as the transmission delay in the time synchronization message PDU.

In Step S704, the salve device receives the time synchronization message PDU, extracts information on the standard date and time as well as that on the transmission delay to acquire actual standard date and time.

In Step S705, the slave device standardizes the local system time using information on the actual standard time.

In Step S706, the slave device extracts information on the standard date and standardizes the local system date accordingly.

Embodiments of the disclosure further provide a system for time synchronization by WiFi-direct, including a master device and a slave device connected via a WiFi-direct connection.

The master device is configured for acquiring information on standard date and time from a base station for time synchronization, and may include a transmission delay calculating unit, a message generating unit and a wireless transceiver.

The slave device is configured for: acquiring the information on the standard date and time actively or passively from the master device through the WiFi-direct connection; calculating actual standard date and time without the impact of a transmission delay using the information on the standard date and time; and setting local system date and time as the actual standard date and time. The slave device may include a wireless transceiver, a time extracting unit, and an analyzing unit. The slave device may further include a time calculating unit and a time adjusting unit.

In active time synchronization, a mobile phone receiving information on the standard date and time from a base station serves as a master device while other digital devices serve as slave devices. A WiFi-direct connection is then established between a slave device and the master device. The wireless transceiver of the slave device sends a time synchronization request to the master device through the WiFi-direct connection to request for the standard date and time. The time synchronization request contains a time a time stamp of sending the time synchronization request. At the master device, after the wireless transceiver receives the time synchronization request, the message generating unit generates the time synchronization response in response to the time synchronization request, the wireless transceiver sends the generated time synchronization response to the slave device. At the slave device, after the wireless transceiver receives the time synchronization response sent by the master device in response to the time synchronization request, the time extracting unit acquires the time stamp of receiving the time synchronization response, the analyzing unit analyzes the time synchronization response to extract information on the standard date and time as well as that on the time stamp of sending the time synchronization request contained in the time synchronization response; the time calculating unit calculates the transmission delay according to the time stamp of receiving the time synchronization response and the time stamp of sending the time synchronization request, and acquires the actual standard date and time by adding the transmission delay to the standard date and time; the time adjusting unit sets the local system date and time as the actual standard date and time.

In passive time synchronization, a mobile phone receiving information on the standard date and time from a base station serves as a master device while other digital devices serve as slave devices. A WiFi-direct connection is then established between a slave device and the master device. At the master device, the transmission delay calculating unit calculates the transmission delay according to information interaction during establishment of the WiFi-direct connection of the master device with the slave device; the message generating unit generates a time synchronization message containing information on the transmission delay and the standard date and time; and the wireless transceiver sends the time synchronization message to the slave device.

In conclusion, embodiments of the disclosure have technical effects as follows.

After receiving information on standard date and time from a base station, a mobile phone transmits the received information to a digital device by WiFi-direct, such that the digital device modifies the local date and time as standard date and time, thereby synchronizing local date and time on each digital device with standard date and time, such that a user may make each digital device display standard date and time effortlessly.

The disclosure is not limited to aforementioned elaboration, and various modifications can be devised by those skilled in the art based on the principle of the disclosure. Any such modification thus should be construed as falling in the protection scope of the disclosure.

The invention claimed is:

1. A method for time synchronization by WiFi-direct, comprising steps of:
   acquiring, by a master device, information on standard date and time from a base station for time synchronization;
   establishing a WiFi-direct connection between the master device and a slave device;
   acquiring, by the slave device, the information on the standard date and time actively or passively from the master device through the WiFi-direct connection; and
   acquiring, by the salve device, actual standard date and time by adding a transmission delay to the standard date and time, and setting local system date and time as the actual standard date and time,
   wherein information interaction between the master device and the slave device is based on a request-response mode, and the transmission delay is acquired by: calculating a difference between time of receiving a response to a request and time of sending the request; and then dividing the difference by 2.

2. The method according to claim 1, wherein the step of acquiring, by the slave device, the information on the standard date and time actively comprises steps of:
   sending, by the slave device, a time synchronization request to the master device through the WiFi-direct connection to request for the standard date and time, wherein the time synchronization request contains a time stamp of sending the time synchronization request;
   receiving, by the slave device, a time synchronization response sent by the master device in response to the time synchronization request, and acquiring a time stamp of receiving the time synchronization response; and analyzing, by the slave device, the time synchronization response, and extracting the information on the standard date and time as well as the time stamp of sending the time synchronization request contained in the time synchronization response.

3. The method according to claim 2, further comprising: after the acquiring, by the slave device, the information on the standard date and time actively and before the acquiring, by the salve device, actual standard date and time, calculating, by the slave device, the transmission delay according to the time stamp of receiving the time synchronization response and the time stamp of sending the time synchronization request.

4. The method according to claim 1, wherein the step of acquiring, by the slave device, the information on the standard date and time passively comprises steps of:

calculating, by the master device, the transmission delay according to the information interaction during establishment of the WiFi-direct connection of the master device with the slave device;

generating, by the master device, a time synchronization message containing information on the transmission delay and the standard date and time, and sending the time synchronization message to the slave device; and after receiving the time synchronization message, extracting, by the slave device, the information on the transmission delay and the standard date and time.

5. A system for time synchronization by WiFi-direct, comprising a master device and a slave device connected via a WiFi-direct connection, wherein the master device is configured for acquiring information on standard date and time from a base station for time synchronization; and the slave device is configured for: acquiring the information on the standard date and time actively or passively from the master device through the WiFi-direct connection; acquiring actual standard date and time by adding a transmission delay to the standard date and time; and setting local system date and time as the actual standard date and time, wherein information interaction between the master device and the slave device is based on a request-response mode, and the transmission delay is acquired by: calculating a difference between time of receiving a response to a request and time of sending the request; and then dividing the difference by 2.

6. The system according to claim 5, wherein the slave device comprises:
    at least one hardware processor;
    memory in electronic communication with the at least one hardware processor; and
    instructions stored in the memory, the instructions being executable by the at least one hardware processor for:
    sending a time synchronization request to the master device through the WiFi-direct connection to request for the standard date and time, and receiving a time synchronization response sent by the master device in response to the time synchronization request, wherein the time synchronization request contains a time stamp of sending the time synchronization request;
    acquiring a time stamp of receiving the time synchronization response; and
    analyzing the time synchronization response to extract the information on the standard date and time as well as the time stamp of sending the time synchronization request contained in the time synchronization response.

7. The system according to claim 6, wherein the instructions are executable by the at least one hardware processor for
    calculating the transmission delay according to the time stamp of receiving the time synchronization response and the time stamp of sending the time synchronization request.

8. The system according to claim 5, wherein the master device comprises:
    at least one hardware processor;
    memory in electronic communication with the at least one hardware processor; and
    instructions stored in the memory, the instructions being executable by the at least one hardware processor for:
    calculating the transmission delay according to the information interaction during establishment of the WiFi-direct connection of the master device with the slave device;
    generating a time synchronization message containing information on the transmission delay and the standard date and time; and
    sending the time synchronization message to the slave device.

9. The system according to claim 8, wherein the instructions are executable by the at least one hardware processor for generating a time synchronization response in response to a time synchronization request.

* * * * *